Figure 1:
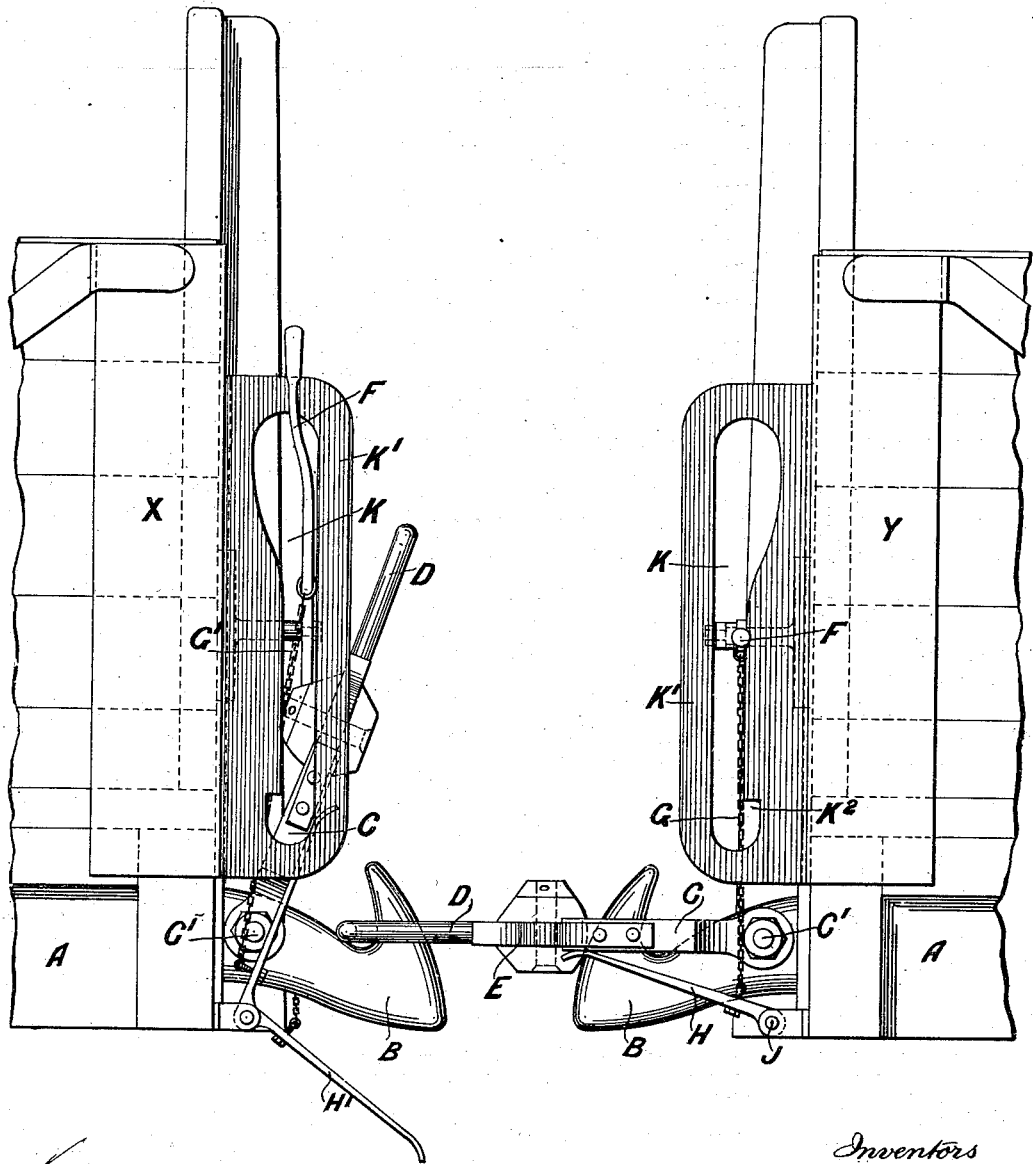

No. 654,939. Patented July 31, 1900.
A. BROOKER & W. BAILEY.
COUPLING FOR RAILWAY CARRIAGES.
(Application filed Mar. 28, 1900.)
(No Model.)  3 Sheets—Sheet 1.

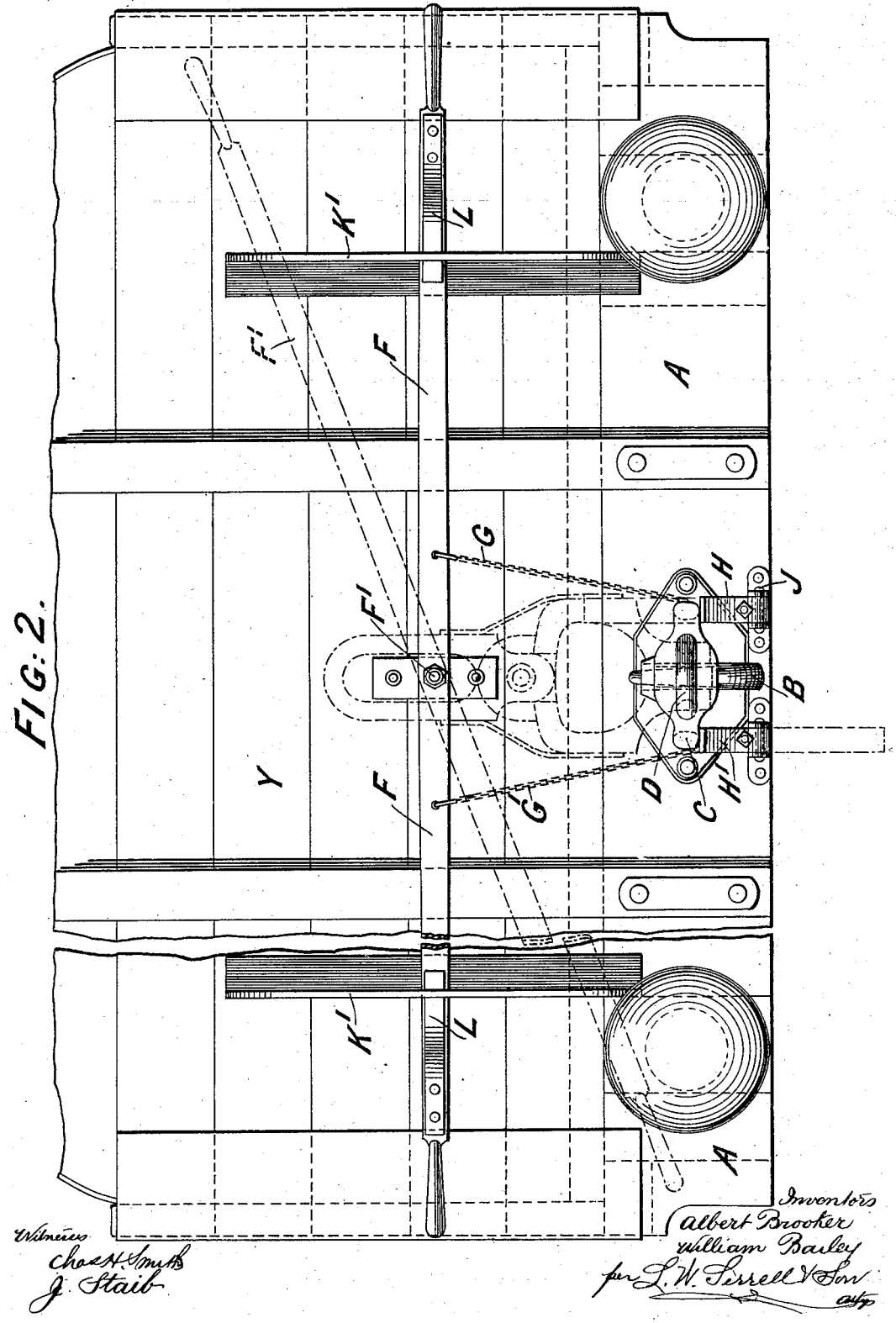

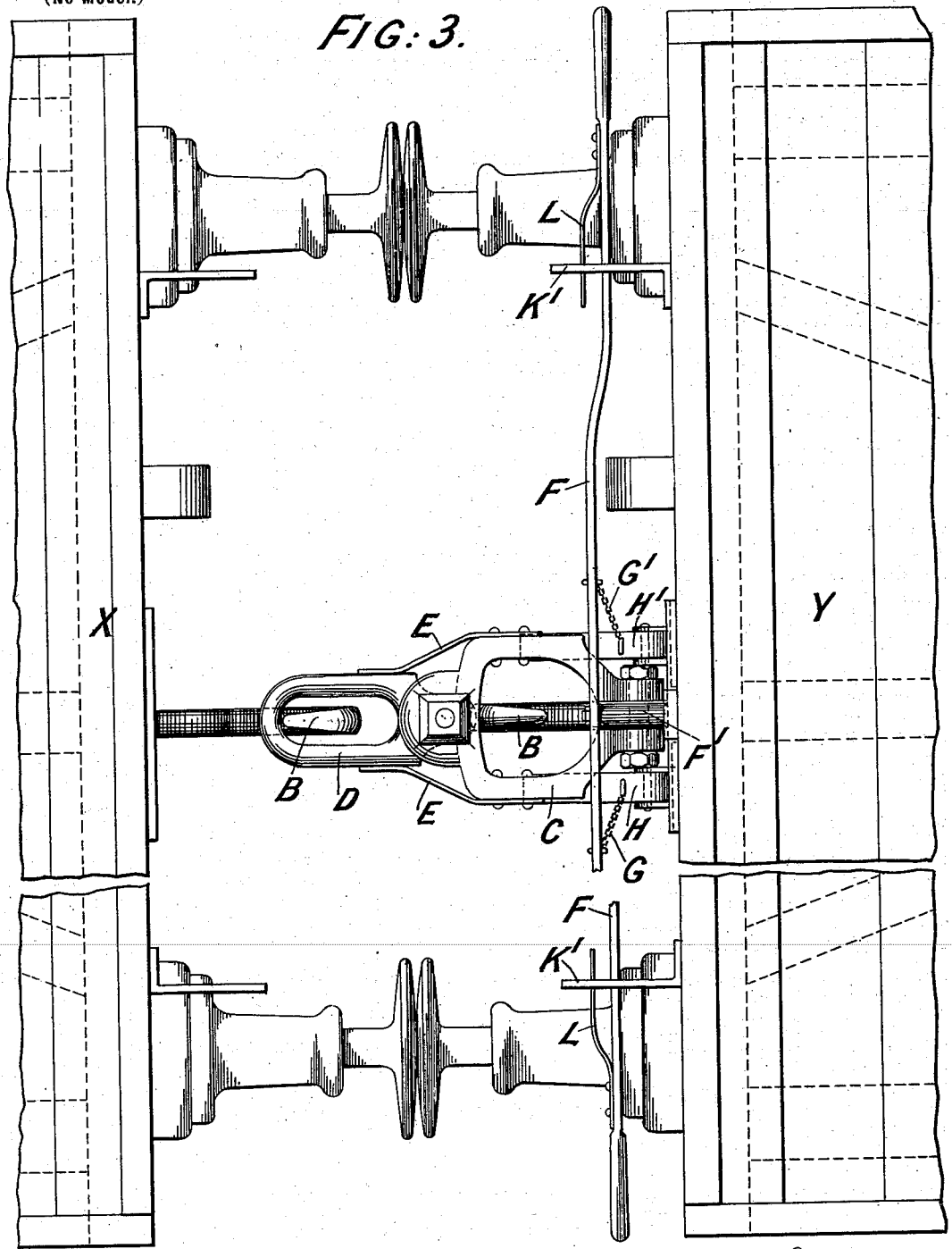

UNITED STATES PATENT OFFICE.

ALBERT BROOKER AND WILLIAM BAILEY, OF EASTLEIGH, ENGLAND.

COUPLING FOR RAILWAY-CARRIAGES.

SPECIFICATION forming part of Letters Patent No. 654,939, dated July 31, 1900.

Application filed March 28, 1900. Serial No. 10,430. (No model.)

*To all whom it may concern:*

Be it known that we, ALBERT BROOKER, wagon-maker, of 8 West View, George street, New Town, Eastleigh, and WILLIAM BAILEY, coach-maker, of 61 Winchester road, Eastleigh, in the county of Hants, England, have invented certain new and useful Couplings for Railway Carriages or Vehicles, (for which we have made application for patent in Great Britain, dated September 8, 1899, No. 18,186,) of which the following is a specification.

This invention refers to the arrangement and combination of parts hereinafter described, composing an automatically-acting coupling for railway-vehicles so constructed that the automatic coupling action is certain at whatever speed the vehicles are brought together, the connection so made is perfectly secure, the couplings are easily disconnected by an attendant standing at either side of the vehicles and without the said attendant entering between the said vehicles, and the mechanism is of simple character and construction.

Each draw-bar employed in carrying out our invention is or may be located centrally of the under frame of the vehicle and is controlled by a spring or springs, each of the said draw-bars terminating in an upwardly and backwardly extending hook formed so that the front of the hook portion presents an ascending incline, such a hooked draw-bar so mounted being now well known on many railway-lines.

We will describe our invention with reference to the accompanying drawings.

Figure 1 shows in side elevation portions of the adjacent ends of two railway-vehicles coupled together, the said vehicles being fitted with our improved coupling devices. Fig. 2 is a part end view of a vehicle with our coupling applied thereto; and Fig. 3 is a plan view of Fig. 1, the coupling-link of the left-hand vehicle having been removed in the drawings in order not to complicate the illustration.

Referring to the drawings, it will be observed that each end of each vehicle is fitted with exactly similar coupling devices, and therefore it will be sufficient to describe in detail the coupling devices upon one end of one of the vehicles, the similar parts upon the other vehicle being marked with like reference-letters.

Now according to our invention, A is the under frame, and to the shank of the hook B of the draw-bar we pivot a shackle C, the pivot C' passing horizontally through the said shank of the hook B, so as to allow the shackle C to be swung vertically upon said pivot C'. The shackle C is so constructed that when it is uncontrolled it will fall and lie in a horizontal plane, being supported by its free front end resting on the front end of the hook B, near the base of the incline thereof. To the front end of the shackle C we pivot a link D in such manner as to be capable of lateral movement relatively to and in the same plane as the shackle C, and springs E, carried by the shackle C, are fitted so as to act laterally on the link D and normally tend to maintain the said link in its central position. The link D may be of any required formation; but we prefer the employment of a link of somewhat-oblong shape pivoted to the shackle at one of its narrow or small ends, as shown.

All the draw-bars of a series of vehicles are fitted as described, and it will be understood that if upon one of the vehicles (marked X) the shackle C, with its link D, is turned on its pivot C' in the draw-bar into a nearly-vertical position, as shown at Fig. 1, and there held by means to be hereinafter described upon this vehicle X being brought into contact with a vehicle Y, the shackle C of which has been left in its normal position, it will follow that the horizontally-supported link D of vehicle Y will strike the incline of the draw-hook B of vehicle X, rise on the incline of same, and fall into the grip of the said hook B, and the vehicle X and Y will be coupled up. To uncouple the vehicles, it is necessary to raise the engaging shackle C and link D from the grip of the hook B.

The means we employ to control the position of the shackle C is entirely operated from either side of the vehicle, and there is no necessity whatever for an attendant to pass between the vehicles when coupling up or uncoupling. Such means consist as follows: Centrally upon the end wall of the vehicle we pivot a lever F, the latter being capable of motion on its pivot F', Figs. 2 and 3, in a plane parallel to the end of the vehicle, the two arms of the lever F extending in opposite directions, so as to be within convenient reach from either side of the said vehicle, the terminal ends being formed as handles. Attached to the lever F upon each side of the fulcrum of same there is a flexible connection, such as a flexible wire rope or chain G G', and these chains extend downward, and the lower ends are respectively attached to two arms H H', which are hinged at J to the end of the vehicle-frame and lie immediately beneath the side bars of the shackle C. By this arrangement when the lever F is in its horizontal position, as shown in full lines at Fig. 2, the shackle C is in its horizontal position, ready for coupling up, whereas when the lever F is rocked from either side into an angular position, as shown, for example, by the dotted lines at Fig. 2, the shackle C is raised and becomes inoperative, as is shown by the shackle C on vehicle X of Fig. 1. The arms of the lever F near the extremities pass through slots K, Fig. 1, in guard or guide plates K', fixed to the end of the vehicle, and such slots K are formed with notches K² to retain the lever F in position, and there are springs L provided on the lever F to produce the required friction in the slots K and prevent accidental motion. When two vehicles are about to be coupled, the lever F of one should be horizontal, with the shackle C down, as vehicle Y, Fig. 1, and the lever F of the other vehicle X should have one of its arms depressed into a notch of the guide-plates K' and the shackle C thereby raised out of action, and upon the vehicles being brought together coupling will take place as described.

What we claim as our invention, and desire to secure by Letters Patent, is—

1. In a coupling for railway-vehicles, the combination with a draw-bar hook having an upwardly and rearwardly inclined front face; of a shackle jointed to the shank of the hook by a horizontal pivot-pin, the shackle encircling the hook and normally supported thereon in a horizontal position, a coupling-link jointed by a vertical pivot-pin to the forward end of the shackle, laterally-placed springs upon the latter to bear against the sides of the link to maintain the link centrally when free, and mechanism controlled by a lever extending entirely across the end of the vehicle and capable of being operated upon either side thereof to turn the shackle and link into a nearly-vertical position either to uncouple from an opposite draw-hook or to hold same out of action when the vehicles are coupled by a similar link and shackle of an opposite vehicle, as set forth.

2. In a coupling for railway-vehicles, the combination with a draw-bar hook having an upwardly and rearwardly inclined front face calculated to raise an opposite coupling-link and direct same into the bite of the hook, a shackle horizontally jointed to the shank of the hook and normally resting thereon in a horizontal position, a coupling-link jointed by a vertical pivot-pin to the forward end of the shackle, and laterally-placed springs upon the shackle to maintain the link centrally when free; of an operating-lever pivoted centrally upon and extending entirely across the end of the vehicle, arms hinged upon horizontal pivots to the end of the vehicle, one such beneath each side of the shackle, and two flexible connections extending from the actuating-lever to the hinged arms one such connection extending from each side of the lever to the said arms whereby by rocking the actuating-lever out of the horizontal position, the shackle and links are raised out of action as set forth.

3. In a coupling for railway-vehicles, the combination with a draw-bar hook having an upwardly and rearwardly inclined front face, a shackle horizontally jointed to the shank of the hook, a coupling-link vertically jointed to the forward end of the shackle, and springs upon the shackle to act upon the link and maintain the latter normally central; of an operating-lever pivoted centrally upon and extending entirely across the end of the vehicle, mechanism for raising the shackle and link out of action, flexible connections from the operating-lever to the said shackle and link raising mechanism, and slotted guide-plates on the end of the vehicle, the arms of the lever passing through the slots, springs on the lever-arms to act in the slots and frictionally maintain the horizontal position of the lever, and notches at the base of the slots to normally maintain the angular position of the lever when so placed, as set forth.

ALBERT BROOKER.
WILLIAM BAILEY.

Witnesses:
THOMAS ROGERS,
WILLIAM ANDREW MARSHALL.